United States Patent
Li et al.

(10) Patent No.: US 11,780,981 B2
(45) Date of Patent: Oct. 10, 2023

(54) FOAM BEADS AND METHOD OF MAKING THE SAME

(71) Applicant: ExxonMobil Chemical Patents Inc., Baytown, TX (US)

(72) Inventors: Liang Li, Shanghai (CN); Yadong He, Beijing (CN); Chunling Xin, Beijing (CN); Xue Bai, Beijing (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 160 days.

(21) Appl. No.: 16/682,224

(22) Filed: Nov. 13, 2019

(65) Prior Publication Data

US 2020/0181350 A1    Jun. 11, 2020

Related U.S. Application Data

(60) Provisional application No. 62/776,142, filed on Dec. 6, 2018.

(51) Int. Cl.
  *C08J 9/18* (2006.01)
  *C08J 9/228* (2006.01)

(52) U.S. Cl.
  CPC .......... *C08J 9/18* (2013.01); *C08J 9/228* (2013.01); *C08J 2203/06* (2013.01); *C08J 2203/22* (2013.01); *C08J 2205/044* (2013.01); *C08J 2205/052* (2013.01); *C08J 2323/14* (2013.01)

(58) Field of Classification Search
  CPC . C08J 9/18; C08J 9/228; C08J 2203/06; C08J 2203/22; C08J 2205/044; C08J 2205/052; C08J 2323/14; C08J 2203/08; C08J 2323/16
  See application file for complete search history.

(56) References Cited

U.S. PATENT DOCUMENTS

| | | | |
|---|---|---|---|
| 6,458,598 B1 * | 10/2002 | Huang | G01N 1/30 435/40.51 |
| 6,800,669 B2 | 10/2004 | Thoen et al. | |
| 8,492,447 B2 | 7/2013 | Jacob et al. | |
| 10,442,910 B2 | 10/2019 | Baghdadi et al. | |
| 2004/0254254 A1 * | 12/2004 | Hashimoto | C08J 9/122 521/57 |
| 2005/0236728 A1 * | 10/2005 | Maletzko | C08J 9/20 521/142 |
| 2009/0247656 A1 | 10/2009 | Jacob et al. | |
| 2012/0329892 A1 | 12/2012 | Prissok et al. | |
| 2016/0009887 A1 | 1/2016 | Fukuzawa | |
| 2017/0066894 A1 * | 3/2017 | Williams | C08L 23/0815 |
| 2018/0345576 A1 * | 12/2018 | Constantinou | B29C 64/268 |

FOREIGN PATENT DOCUMENTS

| | | | |
|---|---|---|---|
| CN | 106750944 A | * | 5/2017 |
| DE | 3931043 | * | 7/1990 |
| EP | 3 202 837 | | 8/2017 |
| EP | 3 305 837 | | 4/2018 |
| WO | 94/20568 | | 9/1994 |

* cited by examiner

*Primary Examiner* — K. Boyle (57) ABSTRACT

The present disclosure relates to foam beads of an elastomeric composition comprising a propylene-based elastomer. The foam bead has a density of less than 0.5 g/cm³. The foam beads can be made from pellets of elastomeric compositions by expanding with supercritical fluid blowing agent. The foamed bead has reduced lightness while maintaining elasticity.

20 Claims, 3 Drawing Sheets

FOAM BEADS AND METHOD OF MAKING THE SAME

CROSS-REFERENCE TO RELATED APPLICATIONS

This application claims priority to U.S. Ser. No. 62/776,142, filed Dec. 6, 2018, herein incorporated by reference.

FIELD OF THE INVENTION

This invention relates to foam beads including propylene-based elastomeric compositions, in particular to foam beads of propylene-based elastomers, and methods of making the same.

BACKGROUND OF THE INVENTION

Foam beads, or expanded beads, are used to reduce weight and density of bulk materials while keeping excellent elasticity in various applications, such as sports goods for example running shoes, cushioning materials, vibration-damping materials, and automotive components because of its reduced density and good physical properties such as elasticity.

Foam beads can be made from thermoplastic polyurethane ("TPU"), polystyrene, and polyolefin resins. Among them, polystyrene foam beads are most commonly used, and recently TPU foam beads have been studied for improved lightness and recovery behavior. International Application Publication No. WO 94/20568 describes expanded, i.e., foamed, TPU beads which can be processed to give moldings. U.S. Patent Application Publication No. 2012/0329892 and European Patent Application Publication No. EP 3305837 also disclose TPU foam beads. Such TPU beads can be produced by a gas impregnation pre-expansion method or by a direct expansion method. European Patent Application Publication EP 3202837A1 discloses expanded particles including a resin having a glass transition temperature of 180° C. or above. The making of such beads requires two expanding steps.

However, TPU expanded beads are expensive, absorb moisture easily, and are prone to hydrolysis due to their chemical nature.

There is a need for alternative foam beads that can be provided at lower cost and can offer lightness in weight while maintaining good elasticity, preferably better performance on weight reduction and elasticity than TPU foam beads, and less sensitivity to moisture. There is also a need for a method of making such foam beads, preferably that is free of chemical foaming agent.

SUMMARY OF THE INVENTION

The present invention provides foams and foam beads of a propylene-based elastomeric composition and the foam beads have a density of less than 0.5 g/cm$^3$, or less than 0.3 g/cm$^3$, or less than 0.1 g/cm$^3$.

In some embodiments, the propylene-based elastomeric composition may comprises a propylene-based elastomer which comprises at least about 75 wt. % units derived from propylene and less than about 25 wt. % of units derived from at least one of ethylene and/or C$_4$-C$_{20}$ alpha-olefins, based on the weight of the propylene-based elastomer, and has an mm propylene triad tacticity by $^{13}$C NMR of at least 75%, and a heat of fusion of less than about 75 J/g.

Preferably, the foams and foamed beads have an expansion rate, calculated by dividing the density of the propylene-based elastomeric composition by the density of the foam bead, of at least 3, an average diameter of from about 1 to about 20 mm.

Also provided is a method for making the foam beads of a propylene-based elastomeric composition, comprising the steps of: (a) expanding the pellets of the propylene-based elastomeric composition in a chamber with a supercritical fluid blowing agent for a time period of about 0.1 minutes to about 10 hours; and (b) recovering the expanded pellets from the chamber to obtain the foam beads. In some embodiments, non-pellets, such as plates or sheets of the propylene-based elastomeric compositions can be used in step (a) for expansion and foams can be recovered in step (b).

In some embodiments, the blowing agent comprises at least one of carbon dioxide, water, nitrogen, or hydrocarbons having 1 to 5 carbon atoms, and preferably the process does not include use of a chemical blowing agent.

Also provided is an article made from the foam beads of the present invention.

BRIEF DESCRIPTION OF THE DRAWINGS

FIG. 2 (a) to (b) show the dimension of the foamed beads made in examples 18 to 20 of the present invention, respectively.

FIG. 3 (a) to (b) show the distribution of foam cells in a cross section of foamed beads made in examples 18 to 20 of the present invention, respectively.

DETAILED DESCRIPTION OF THE PRESENT INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

As used herein, a "polymer" may be used to refer to homopolymers and copolymers. Except as stated otherwise, the term "copolymer" means a polymer derived from two or more monomers (including terpolymers, tetrapolymers, etc.).

As used herein, when a polymer is referred to as comprising a monomer, the monomer is present in the polymer in the polymerized form of the monomer or in the derivative form of the monomer.

As used herein, when a polymer composition or blend is said to comprise a certain percentage, wt. %, of a monomer, that percentage of monomer is based on the total amount of monomer units in all the polymer components of the composition or blend, unless otherwise stated.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber(s)".

As used herein, "propylene-based" refers to any polymer or composition of polymers (such as blends of polymers) comprising at least 50 wt. % units derived from propylene.

As used herein, a composition "free of" a component refers to a composition substantially devoid of the component, or comprising the component in an amount of less than about 0.01 wt. %, by weight of the total composition.

Propylene-Based Elastomer

Foam beads may comprise an elastomeric composition including a propylene-based elastomer. The propylene-based elastomer is an elastomeric copolymer containing propylene-derived units and at least one comonomer derived from at least one of ethylene or a $C_4$-$C_{10}$ alpha-olefin. The propylene-based elastomer may contain at least about 75 wt. % propylene-derived units. The propylene-based elastomer may have limited crystallinity due to adjacent isotactic propylene units and a melting point as described herein. The crystallinity and the melting point of the propylene-based elastomer may be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The amount of propylene-derived units present in the propylene-based elastomer may range from an upper limit of about 97 wt. %, about 95 wt. %, about 94 wt. %, about 92 wt. %, about 90 wt. %, or about 85 wt. %, to a lower limit of about 75 wt. %, about 78 wt. %, about 80 wt. %, about 81 wt. %, about 83 wt. %, or about 85 wt. % of the propylene-based elastomer.

The units, or comonomers, derived from at least one of ethylene or a $C_4$-$C_{20}$ alpha-olefin may be present in an amount of about 3 wt. % to about 25 wt. %, or about 5 wt. % to about 25 wt. %, or about 7 wt. % to about 20 wt. %, or about 8 wt. % to about 18 wt. %, of the propylene-based elastomer.

In preferred embodiments, the comonomer is ethylene, 1-hexene, or 1-octene, with ethylene being most preferred. In embodiments where the propylene-based elastomer comprises ethylene-derived units, the propylene-based elastomer may comprise about 3 wt. % to about 25 wt. %, or about 7 wt. % to about 20 wt. %, or about 8 wt. % to about 18 wt. %, ethylene-derived units. In some embodiments, the propylene-based elastomer consists essentially of units derived from propylene and ethylene, i.e., the propylene-based elastomer does not contain any other comonomer in an amount other than that typically present as impurities in the ethylene and/or propylene feedstreams used during polymerization, or in an amount that would materially affect the heat of fusion, melting point, crystallinity, or melt flow rate of the propylene-based elastomer, or in an amount such that any other comonomer is intentionally added to the polymerization process.

In some embodiments, the propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In embodiments where more than one comonomer derived from at least one of ethylene or a $C_4$-$C_{10}$ alpha-olefin is present, the amount of one comonomer may be less than about 5 wt. % of the propylene-based elastomer, but the combined amount of comonomers of the propylene-based elastomer is about 3 wt. % or greater.

The propylene-based elastomer may have a triad tacticity of three propylene units, as measured by $^{13}$C NMR, of at least about 75%, at least about 80%, at least about 82%, at least about 85%, or at least about 90%. Preferably, the propylene-based elastomer has a triad tacticity of about 50 to about 99%, or about 60 to about 99%, or about 75 to about 99%, or about 80 to about 99%. In some embodiments, the propylene-based elastomer may have a triad tacticity of about 60 to 97%.

The propylene-based elastomer has a heat of fusion ("$H_f$"), as determined by DSC, of about 75 J/g or less, or about 70 J/g or less, or about 50 J/g or less, or about 40 J/g or less. The propylene-based elastomer may have a lower limit $H_f$ of about 0.5 J/g, or about 1 J/g, or about 5 J/g. For example, the $H_f$ value may range from about 1.0 J/g, 1.5 J/g, 3.0 J/g, 4.0 J/g, 6.0 J/g, or 7.0 J/g, to about 30 J/g, 35 J/g, 40 J/g, 50 J/g, 60 J/g, 70 J/g, 75 J/g, or 75 J/g.

The propylene-based elastomer may have a percent crystallinity, as determined according to the DSC procedure described herein, of about 2% to about 65%, or about 0.5% to about 40%, or about 1% to about 30%, or about 5% to about 35%, of the crystallinity of isotactic polypropylene. The thermal energy for the highest order of propylene (i.e., 100% crystallinity) is estimated at 189 J/g. In some embodiments, the copolymer has crystallinity less than 40%, or in the range of about 0.25% to about 25%, or in the range of about 0.5% to about 22% of the crystallinity of isotactic polypropylene.

Embodiments of the propylene-based elastomer may have a tacticity index m/r from a lower limit of about 4, or about 6, to an upper limit of about 8, or about 10, or about 12. In some embodiments, the propylene-based elastomer has an isotacticity index greater than 0%, or within the range having an upper limit of about 50%, or about 25%, and a lower limit of about 3%, or about 10%.

In some embodiments, the propylene-based elastomer may further comprise diene-derived units (as used herein, "diene"). The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidene norbornene ("ENB"), cycloalkenyl norbornenes, and cycloalkylidene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene)); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of diene-derived units present in the propylene-based elastomer may range from an upper limit of about 15 wt. %, 10 wt. %, about 7 wt. %, about 5 wt. %, about 4.5 wt. %, about 3 wt. %, about 2.5 wt. %, or about 1.5 wt. %, to a lower limit of about 0 wt. %, about 0.1 wt. %, about 0.2 wt. %, about 0.3 wt. %, about 0.5 wt. %, about 1 wt. %, about 3 wt. %, or about 5 wt. %, based on the total weight of the propylene-based elastomer.

The propylene-based elastomer may have a single peak melting transition as determined by DSC. In some embodiments, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based elastomer. The propylene-based elastomer may have a $T_m$ of about 110° C. or less, about 105° C. or less, about 100° C. or less, about 90° C. or less, about 80° C. or less, or about 70° C. or less. In some embodiments, the propylene-based elastomer has a $T_m$ of about 25° C. to about 105° C., or about 60° C. to about 105° C., or about 70° C. to about 105° C., or about 90° C. to about 105° C.

The propylene-based elastomer may have a density of about 0.850 g/cm$^3$ to about 0.900 g/cm$^3$, or about 0.860 g/cm$^3$ to about 0.880 g/cm$^3$, at room temperature as measured per ASTM D1505.

The propylene-based elastomer may have a melt flow rate ("MFR"), as measured per ASTM D1238, 2.16 kg at 230° C., of at least about 2 g/10 min. In some embodiments, the propylene-based elastomer may have an MFR of about 2 g/10 min to about 50 g/10 min, or about 2 g/10 min to about 45 g/10 min, or about 2 g/10 min to about 20 g/10 min.

The propylene-based elastomer may have an Elongation at Break of less than about 2000%, less than about 1800%, less than about 1500%, less than about 1000%, or less than about 800%, as measured per ASTM D412.

The propylene-based elastomer may have a weight average molecular weight ($M_w$) of about 5,000 to about 5,000,000 g/mole, or about 10,000 to about 1,000,000 g/mole, or about 50,000 to about 400,000 g/mole. The propylene-based elastomer may have a number average molecular weight ($M_n$) of about 2,500 to about 250,000 g/mole, or about 10,000 to about 250,000 g/mole, or about 25,000 to about 250,000 g/mole. The propylene-based elastomer may have a z-average molecular weight ($M_z$) of about 10,000 to about 7,000,000 g/mole, or about 80,000 to about 700,000 g/mole, or about 100,000 to about 500,000 g/mole.

The propylene-based elastomer may have a molecular weight distribution ("MWD") of about 1.5 to about 20, or about 1.5 to about 15, or about 1.5 to about 5, or about 1.8 to about 3, or about 1.8 to about 2.5.

In some embodiments, the propylene-based elastomer is an elastomer including propylene-crystallinity, a melting point by DSC equal to or less than 105° C., and a heat of fusion of from about 5 J/g to about 45 J/g. The propylene-derived units are present in an amount of about 80 wt. % to about 90 wt. %, based on the total weight of the propylene-based elastomer. The ethylene-derived units are present in an amount of about 8 wt. % to about 18 wt. %, for example, about 8 wt. %, about 8.5 wt. %, about 9 wt. %, about 9.5 wt. %, about 10 wt. %, about 10.5 wt. %, about 11 wt. %, about 11.5 wt. %, about 12 wt. %, about 12.5 wt. %, about 13 wt. %, about 13.5 wt. %, about 14 wt. %, about 14.5 wt. %, about 15 wt. %, about 15.5 wt. %, about 16 wt. %, about 16.5 wt. %, about 17 wt. %, about 17.5 wt. %, about 18 wt. %, based on the total weight of the propylene-based elastomer.

The elastomeric compositions disclosed herein may include one or more different propylene-based elastomers, i.e., propylene-based elastomers each having one or more different properties such as, for example, different comonomer or comonomer content. Such combinations of various propylene-based elastomers are all within the scope of the invention.

Optionally, the propylene-based elastomers may be grafted (i.e., "functionalized") using one or more grafting monomers. As used herein, the term "grafting" denotes covalent bonding of the grafting monomer to a polymer chain of the propylene-based polymer. The grafting monomer can be or include at least one ethylenically unsaturated carboxylic acid or acid derivative, such as an acid anhydride, ester, salt, amide, imide, acrylates or the like. Illustrative grafting monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In embodiments wherein the graft monomer is maleic anhydride, the maleic anhydride concentration in the grafted polymer is preferably in the range of about 1 wt. % to about 6 wt. %, at least about 0.5 wt. %, or at least about 1.5 wt. %.

In preferred embodiments, the propylene-based elastomer is a reactor grade or reactor blended polymer, as defined above. That is, in preferred embodiments, the propylene-based elastomer is a reactor blend of a first polymer component and a second polymer component. Thus, the comonomer content of the propylene-based elastomer can be adjusted by adjusting the comonomer content of the first polymer component, adjusting the comonomer content of second polymer component, and/or adjusting the ratio of the first polymer component to the second polymer component present in the propylene-based elastomer.

In embodiments where the propylene-based elastomer is a reactor blended polymer, the α-olefin content of the first polymer component ("$R_1$") may be greater than 5 wt. %, greater than 7 wt. %, greater than 10 wt. %, greater than 12 wt. %, greater than 15 wt. %, or greater than 17 wt. %, based upon the total weight of the first polymer component. The α-olefin content of the first polymer component may be less than 30 wt. %, less than 27 wt. %, less than 25 wt. %, less than 22 wt. %, less than 20 wt. %, or less than 19 wt. %, based upon the total weight of the first polymer component. In some embodiments, the α-olefin content of the first polymer component may range from 5 wt. % to 30 wt. %, from 7 wt. % to 27 wt. %, from 10 wt. % to 25 wt. %, from 12 wt. % to 22 wt. %, from 15 wt. % to 20 wt. %, or from 17 wt. % to 19 wt. %. Preferably, the first polymer component comprises propylene and ethylene derived units, or consists essentially of propylene and ethylene derived units.

In embodiments where the propylene-based elastomer is a reactor blended polymer, the α-olefin content of the second polymer component ("R₂") may be greater than 1.0 wt. %, greater than 1.5 wt. %, greater than 2.0 wt. %, greater than 2.5 wt. %, greater than 2.75 wt. %, or greater than 3.0 wt. % α-olefin, based upon the total weight of the second polymer component. The α-olefin content of the second polymer component may be less than 10 wt. %, less than 9 wt. %, less than 8 wt. %, less than 7 wt. %, less than 6 wt. %, or less than 5 wt. %, based upon the total weight of the second polymer component. In some embodiments, the α-olefin content of the second polymer component may range from 1.0 wt. % to 10 wt. %, or from 1.5 wt. % to 9 wt. %, or from 2.0 wt. % to 8 wt. %, or from 2.5 wt. % to 7 wt. %, or from 2.75 wt. % to 6 wt. %, or from 3 wt. % to 5 wt. %. Preferably, the second polymer component comprises propylene and ethylene derived units, or consists essentially of propylene and ethylene derived units.

In embodiments where the propylene-based elastomer is a reactor blended polymer, the propylene-based elastomer may comprise from 1 to 25 wt. % of the second polymer component, from 3 to 20 wt. % of the second polymer component, from 5 to 18 wt. % of the second polymer component, from 7 to 15 wt. % of the second polymer component, or from 8 to 12 wt. % of the second polymer component, based on the weight of the propylene-based elastomer, where desirable ranges may include ranges from any lower limit to any upper limit. The propylene-based elastomer may comprise from 75 to 99 wt. % of the first polymer component, from 80 to 97 wt. % of the first polymer component, from 85 to 93 wt. % of the first polymer component, or from 82 to 92 wt. % of the first polymer component, based on the weight of the propylene-based elastomer, where desirable ranges may include ranges from any lower limit to any upper limit.

The propylene-based elastomer is preferably prepared using homogeneous conditions, such as a continuous solution polymerization process. In some embodiments, the propylene-based elastomer is prepared in parallel solution polymerization reactors, such that the first reactor component is prepared in a first reactor and the second reactor component is prepared in a second reactor, and the reactor effluent from the first and second reactors are combined and blended to form a single reactor effluent from which the final propylene-based elastomer is separated. Exemplary methods for the preparation of propylene-based elastomers may be found in U.S. Pat. Nos. 6,881,800; 7,803,876; 8,013,069; and 8,026,323 and PCT Publications WO 2011/087729; WO 2011/087730; and WO 2011/087731, incorporated herein by reference. The invention is not limited by any particular polymerization method for preparing the propylene-based elastomer, and the polymerization processes are not limited by any particular type of reaction.

Examples of the propylene-based elastomers may be those available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands).

Other Additives

The elastomeric compositions described herein may further comprise one or more additives. Suitable additives include, but are not limited to, fillers, processing aids, antioxidants, UV stabilizers, curing agents, accelerators, flame retardants, colorants or pigments, and combinations thereof. In some embodiments, the composition further comprises at least one additive selected from fillers, processing aids, curing agents, accelerators, or combinations thereof.

The composition of the present invention may include at least one filler. The classes of materials described herein that are useful as fillers can be utilized alone or admixed to obtain desired properties. The filler may be present at from about 50 wt. % to about 150 wt. %, relative to the amount of the propylene-based elastomer. Desirable fillers can be organic fillers and/or inorganic fillers. Organic fillers include such materials as carbon black, fly ash, graphite, cellulose, starch, flour, wood flour, and polymeric fibers like polyester-based, and polyamide-based materials, etc. Preferred examples of inorganic fillers are sodium chloride, calcium carbonate, talc, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, and chalk. Of these fillers, sodium chloride, calcium carbonate, barium sulfate, antimony oxide, talc, silica/glass, glass fibers, alumina, aluminum trihydroxide, magnesium hydroxide, and titanium dioxide, and mixtures thereof are preferred.

The composition can optionally include one or more processing aids. Suitable processing aids can include, but are not limited to, plasticizers, tackifiers, extenders, chemical conditioners, homogenizing agents and peptizers such as mercaptans, petroleum and vulcanized vegetable oils, mineral oils, paraffin oils, polybutene oils, naphthenic oils, aromatic oils, waxes, resins, rosins, or other synthetic fluids having a lower pour point, lower emission, etc., compared to paraffin or mineral oil and the like. Some commercial examples of useful processing aids are SUNDEX™ (Sun Chemicals) and FLEXON™ (ExxonMobil Chemical Company).

Methods for Making the Foam Bead

Also provided is a method of making the foam beads of the present application. In particular, the present method of making foam beads comprises use of a blowing agent that is present as a supercritical fluid.

The method comprises the steps of: (a) expanding the pellets of elastomeric composition in a chamber using a blowing agent under conditions that for a time period of about 0.1 minute to about 10 hours; and (b) recovering the expanded pellets from the chamber to obtain the foam beads.

In an embodiment of the invention, pellets of the elastomeric composition are added into a chamber. Preferably, the chamber is pre-heated to a pre-set temperature prior to the addition of the pellets. In some embodiments, the pre-set temperature can be greater than about 20° C., or greater than about 25° C., or greater than about 30° C., or greater than 40° C., and preferably lower than the melting temperature of the elastomeric composition, for example less than about 110° C., or less than about 100° C., or less than about 90° C., or less than about 80° C., or less than about 70° C., or less than about 60° C., or less than about 50° C., or less than 40° C.

The pellets of the elastomeric composition may have a diameter of 0.1 to 10 mm, or from 0.5 to 5 mm, or from 0.8 to 4 mm, or from 1 to 3 mm. The pellets can be made by any method that is known in the art and the pellets of commercially available grades of the elastomeric composition can be directly used in the method described herein.

In an embodiment of the invention, after the pellets are added, the chamber is sealed and then blowing agent is introduced within the chamber. In some embodiments, before addition of blowing agent, the chamber is vacuated, for example, by a vacuum pump until the chamber has a pressure that is lower than the atmosphere pressure, i.e., the chamber becomes under vacuum. The term "vacuum" as used herein refers to a pressure of less than about 0.1 MPa.

The blowing agent can be added, for example by a pump, into the chamber, which is preferably under vacuum. The blowing agent may be added in an amount such that the pressure of chamber is elevated to a set pressure, for example, from about 1 to about 50 mPa, or from about 3 to about 30 mPa, or from about 5 to about 25 mPa, such as about 10 mPa, or about 15 mPa for making foam beads from propylene-based elastomer. In an embodiment, the chamber pressure is selected to achieve a target foam bead density.

The blowing agent may include physical blowing agents capable of forming a supercritical fluid. The blowing agent may be an organic physical blowing agent, an inorganic physical blowing agent, or a mixture of both. The term "physical blowing agent" used herein generally refers to those materials which are gaseous at temperatures below the processing temperature, i.e., the temperature at which the elastomeric composition is to be expanded. Examples of the organic physical blowing agent include aliphatic hydrocarbons, such as propane, butane, hexane, pentane, heptane etc.; alicyclic hydrocarbons, such as cyclobutane, cyclohexane, etc.; halogenated hydrocarbons, such as chlorofluoromethane, trifluoromethane, 1,1-difluoroethane, 1,1,1,2-tetrafluoroethane, methyl chloride, ethyl chloride, methylene chloride, etc.; dialkyl ethers, such as dimethyl ether, diethyl ether, methyl ethyl ether, etc.; and the like. In addition, examples of the inorganic physical blowing agent include nitrogen, argon, air, water, and the like. In a preferred embodiment, water can be added in addition to the blowing agent.

In some embodiments, the blowing agent is free of a chemical blowing agent. The term "chemical blowing agent" used herein generally refers to those compositions which decompose or react under the influence of heat to release a gas or other substance for foaming purpose. In an embodiment, the blowing agent includes less than 0.01 wt. % chemical blowing agent by total weight of the blowing agent.

In some embodiments, the blowing agent comprises at least one of carbon dioxide, nitrogen, and hydrocarbons having 1 to 6 carbon atoms including, but not limited to, propane, butane, and pentane. In preferred embodiments, at least carbon dioxide is used. Without being bound by any theory, it is believed that carbon dioxide has high compatibility with the present elastomeric compositions, and therefore, the carbon dioxide may be uniformly impregnated in the foam beads with good efficiency. Furthermore, when carbon dioxide is used as the blowing agent, an explosion-proof countermeasure is not required, and it is easy to secure safety. In consequence, the equipment investment costs may be low as compared to systems using flammable or explosive blowing agents. Carbon dioxide is used in the present process also because of its easy availability and low cost.

The optimal concentration of the blowing agent, and water if present, used to form the foam beads depends on the target density and the properties of the elastomeric composition, e.g., the melt flow rate or the like. In some embodiments, the concentration of the blowing agent is about 50 to about 99 parts, or from about 60 to about 95 parts, or from about 70 from to about 90 parts by mass based on 100 parts based on the total mass of the beads.

In some embodiments, carbon dioxide is used in combination with other blowing agents. The blending ratio of carbon dioxide to the total mass of the blowing agent is preferably 50% or more. The lower limit of the blending ratio of the carbon dioxide to the total blowing agent is more preferably about 70% by mass, and still more preferably about 90% by mass. The blending ratio of the carbon dioxide is most preferably 100% by mass.

In some embodiments water can be used as a dispersion medium at the time of expansion. The dispersion medium may optionally include a dispersant, such as a sparingly water-soluble inorganic material, e.g., aluminum oxide, tricalcium phosphate, magnesium pyrophosphate, zinc oxide, kaolin, mica, talc, etc. The dispersion medium may also optionally include a dispersing aid, such as an anionic surfactant, e.g., sodium dodecylbenzenesulfonate, a sodium alkanesulfonate, etc.

After the blowing agent is added into the chamber, the chamber may be further heated and/or pressurized to a supercritical condition, under which the blowing agent forms supercritical fluid. The temperature and pressure required to achieve a supercritical fluid vary based on the composition of the blowing agent. Typically, the conditions include a temperature from about 40° C. to about 200° C. or from about 50° C. to about 170° C., or from about 60° C. to about 150° C., or from about 80° C. to about 120° C. and a pressure of from about 1 to about 50 MPa, or from about 3 to about 40 MPa, or from about 5 to about 25 MPa. For example, the conditions to form a supercritical fluid of carbon dioxide include a temperature of greater than about 31° C. and a pressure of greater than about 7.4 MPa.

The supercritical fluid is held in the chamber for a time period sufficient to allow the blowing agent to impregnate and expand the pellets. In an embodiment, the supercritical fluid is held for not more than about 10 hours. In some embodiments, the time period can be from about 0.1 minute to about 10 hours, depending on the dimensions, desired properties, such as density of pellets, for example, from about 1 minute to about 60 minutes, or from about 0.1 to about 30 minutes, or from about 1 to about 15 minutes, or from about 1 minutes to about 10 hours, or from about 0.5 hours to about 8 hours, or from about 1 hours to about 6 hours, or from about 2 hours to about 6 hours.

After pellets are expanded in the chamber, the chamber can then be rapidly depressurized, typically to atmosphere pressure. The depressurization rate can be controlled to achieve the desired expansion ratio and foam bead structures. In some embodiments, the pellets, after being expanded in the chamber, may be removed from the chamber and cooled until the density of the formed foam beads stabilizes. The foam beads may be cooled quickly in order to stabilize the foam bead structure. For example, the foam beads may be quickly removed from the chamber to allow pellet to be cooled down to stabilize the foam bead.

The expansion ratio of foam beads may be increased by repeating the expansion process one or more times. Foam beads may be placed in a chamber, the chamber pressure reduced under vacuum, a blowing agent introduced to the chamber, the chamber conditions altered to cause the blowing agent to form a supercritical fluid, and after a period of time to allow expansion of the foam beads to a greater expansion ratio, the chamber may be depressurized and the expanded foam beads cooled until stabilized.

Properties of Foam Beads

The foam beads of the present invention have a density of less than about 0.5 g/cm$^3$. The upper limit of the density can be about 0.5, about 0.45, about 0.4, about 0.35, about 0.3, about 0.25, about 0.22, about 0.2, about 0.18, about 0.17, about 0.16, about 0.15, about 0.13, about 0.10, about 0.08, about 0.07, about 0.06, or about 0.05 g/cm³, and the lower limit of the density can be about 0.01, about 0.015, about 0.02, about 0.025, about 0.03, about 0.035, about 0.04, about 0.045, about 0.05, about 0.06, about 0.07, about 0.08, about 0.09, or about 0.1 g/cm³. The density of the foam beads may be in a range between any two of the above values. In some embodiments, the foam beads may have a density of from about 0.01 to about 0.5 g/cm³, or from about 0.01 to about 0.3 g/cm³, or from about 0.015 to about 0.3 g/cm³, or from about 0.02 to about 0.25 g/cm³, or from about 0.025 to about 0.2 g/cm³, or from about 0.03 to 0.15 g/cm³.

The foam beads may have an expansion ratio, calculated by dividing the density of the elastomeric composition by the density of the foam bead. The expansion ratio of the foam beads is at least about 3. The expansion ratio may be about 3.5, about 4, about 4.5, about 5, about 5.5, about 6, about 6.5, about 7, about 7.5, or about 8. The elastomeric composition useful in the present invention typically have a density of greater than about 0.85 g/cm³.

The foam beads have an average diameter of less than about 50 mm. The average diameter may be about 40, about 30, about 25, about 20, about 18, about 15 mm, and preferably greater than about 1, about 2, about 3, about 4, about 5, about 6, about 7, about 8, about 10 mm. The average diameter of the foam beads may be in a range between any two of the above values. In some embodiments the foam beads may have an average diameter of from about 1 to about 50 mm, from about 2 to about 40 mm, from about 3 to about 30 mm, from 4 to about 20 mm, or from 5 to 15 mm. The foam beads may be partitioned and include two or more cells, in at least partially closed form. The average cell diameter can be from about 1 to about 300 micron, or from about 3 to about 200 micron, or from about 5 to about 100 micron, or from about 10 to about 50 micron. In some embodiments the foam bead may have a closed cell ratio of at least about 30%, about 40%, about 50%, about 60%, about 70%, about 80%, about 90%, about 95%, about 98%, or about 99%. The close cell ratio means the percentage of the total amount of cells in the foam beads that are closed.

Articles Made from Foam Beads

The present invention further encompasses an article made from the foam beads. Such articles may include automotive parts, consumer goods, industrial goods, construction materials, and packaging materials. Further examples include, but are not limited to, sports (e.g., running shoes and soles), cushioning materials (e.g., pillows), vibration-damping materials, automobile members, automotive seats, automotive interior components, bumper cores, gap fillers, and packaging materials. In some preferred embodiments the article is a seal part, such as an automotive weather seal part, for example, a glass run channel.

Any known method for making articles from foam beads can be useful to make the present articles, for example, by ways of compression molding. Methods can be such as described in European Patent Application Publication No. EP 3305837A and U.S. Patent Application Publication No. US2018/0044496A1, except the TPU foam beads are replaced with the present foam beads.

EXAMPLES

The present invention, while not meant to be limited by, may be better understood by reference to the following examples and tables.

Material

The following elastomeric material is used to in the illustrative examples.

Vistamaxx™ 6102 performance polymer ("PBE1") is propylene-ethylene elastomer having an ethylene content of 16 wt. %, a density of 0.862 g/cm³, a melt flow rate measured at 2.16 kg, 230° C. of about 3 g/10 min, commercially available from ExxonMobil Chemical Company, Texas.

Vistamaxx™ 3588 performance polymer ("PBE2") is propylene-ethylene elastomer having an ethylene content of 4 wt. %, a density of 0.889 g/cm³, a melt flow rate measured at 2.16 kg, 230° C. of about 8 g/10 min, commercially available from ExxonMobil Chemical Company, Texas.

Vistamaxx™ 3980 performance polymer ("PBE3") is propylene-ethylene elastomer having an ethylene content of 9 wt. %, a density of 0.879 g/cm³, a melt flow rate measured at 2.16 kg, 230° C. of about 8 g/10 min, commercially available from ExxonMobil Chemical Company, Texas.

Examples 1 to 12

Figure 1:
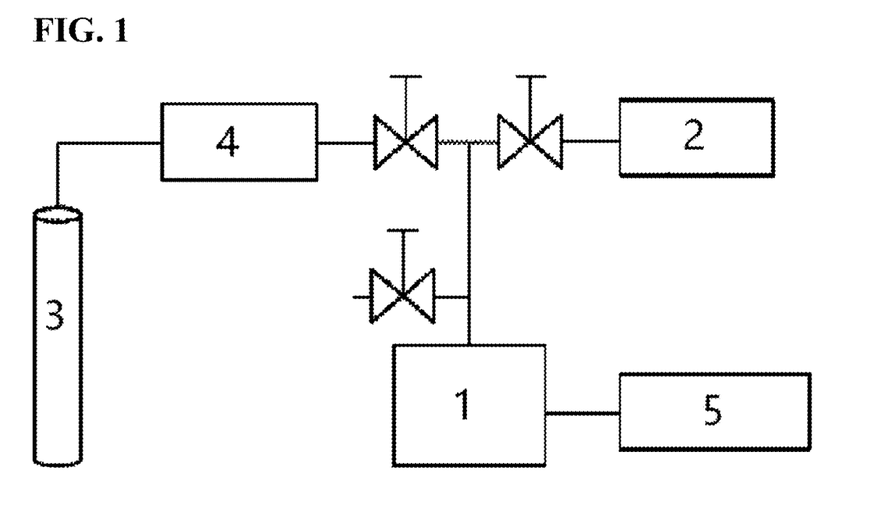
FIG. 1 shows a schematic flow chart of the method of making the foam beads of the present invention.

The following process was used to make the foam beads of the Examples 1 to 12. As shown in FIG. 1, chamber 1 was preheated to the set temperature, such as room temperature, then about 1 cm long 1 cm wide and 1 mm thickness molded sheet of PBE1 and PBE2 were added, respectively, into the chamber 1. $CO_2$ was blown in to replace the air inside chamber 1 and then chamber 1 was sealed. Alternatively, pump 2 may have been used to vacuum the chamber 1 after chamber 1 was sealed. After that, $CO_2$ was pumped via a booster pump 4 from tank 3 into the chamber 1 until the chamber had a different set pressure (10 MPa, 15 MPa, 20 MPa, respectively). Chamber 1 was then heated to a different expansion temperature as shown in Tables 1 and 2 via a temperature control unit 5 and the sheets were impregnated and expanded by $CO_2$ in the chamber for a period of time as shown in Tables 1 and 2. After that, a valve connected with chamber 1 was quickly opened to release the pressure of chamber 1. The sample expanded with $CO_2$ was quickly removed to measure its weight. The temperature, pressure and time for expansion are shown in Tables 1 and 2.

TABLE 1

Conditions and Properties of Foam Beads Made from PBE1

| Expansion Temperature (° C.) | Set Pressure (mPa) | Sample number | Expansion Time (h) | Density (g/cc) | Expansion Ratio |
|---|---|---|---|---|---|
| 55° C. | 10 | 1-1 | 2 | 0.2674 | 3.22 |
|  |  | 1-2 | 3 | 0.2523 | 3.42 |
|  |  | 1-3 | 4 | 0.2074 | 4.16 |
|  |  | 1-4 | 5 | 0.1622 | 5.31 |
|  |  | 1-5 | 6 | 0.1669 | 5.16 |
|  | 15 | 2-1 | 2 | 0.1635 | 5.27 |
|  |  | 2-2 | 3 | 0.2939 | 2.93 |
|  |  | 2-3 | 4 | 0.2250 | 3.83 |
|  |  | 2-4 | 5 | 0.2122 | 4.06 |
|  | 20 | 3-1 | 2 | 0.1861 | 4.63 |
|  |  | 3-2 | 3 | 0.1763 | 4.89 |
|  |  | 3-3 | 4 | 0.2173 | 3.97 |
|  |  | 3-4 | 5 | 0.1615 | 5.34 |
| 60° C. | 10 | 4-1 | 5 | 0.1055 | 8.17 |
|  |  | 4-2 | 6 | 0.1298 | 6.64 |
|  | 15 | 4-3 | 5 | 0.1397 | 6.17 |
|  |  | 4-4 | 6 | 0.1087 | 7.93 |
|  | 20 | 4-5 | 3 | 0.1194 | 7.22 |
|  |  | 4-6 | 4 | 0.1078 | 8.00 |

TABLE 1-continued

Conditions and Properties of Foam Beads Made from PBE1

| Expansion Temperature (° C.) | Set Pressure (mPa) | Sample number | Expansion Time (h) | Density (g/cc) | Expansion Ratio |
|---|---|---|---|---|---|
| 65° C. | 10 | 5-1 | 5 | 0.1201 | 7.18 |
|  |  | 5-2 | 6 | 0.1259 | 6.85 |
|  | 15 | 5-3 | 5 | 0.1251 | 6.89 |
|  |  | 5-4 | 6 | 0.1032 | 8.35 |
|  | 20 | 5-5 | 3 | 0.1324 | 6.51 |
|  |  | 5-6 | 4 | 0.1472 | 5.85 |

TABLE 2

Conditions and Properties of Foam Beads Made from PBE2

| Set Pressure (mPa) | Expansion Temperature (° C.) | Sample number | Expansion Time (h) | Density (g/cc) | Expansion Ratio |
|---|---|---|---|---|---|
| 10 | 95 | 6-1 | 1 | 0.2682 | 3.44 |
|  |  | 6-2 | 2 | 0.2607 | 3.54 |
|  |  | 6-3 | 3 | 0.2899 | 3.18 |
|  |  | 6-4 | 4 | 0.2714 | 3.40 |
|  | 97 | 7-1 | 1 | 0.1481 | 6.23 |
|  |  | 7-2 | 2 | 0.1456 | 6.34 |
|  | 100 | 7-3 | 1 | 0.0520 | 17.76 |
|  |  | 7-4 | 2 | 0.0441 | 20.91 |
|  |  | 7-5 | 3 | 0.0584 | 15.81 |
|  |  | 7-6 | 4 | 0.0730 | 12.64 |
|  | 102 | 8-1 | 1 | 0.0460 | 20.06 |
|  |  | 8-2 | 2 | 0.0593 | 15.56 |
|  |  | 8-3 | 3 | 0.0407 | 22.70 |
| 15 | 95 | 9-1 | 1 | 0.0750 | 12.31 |
|  |  | 9-2 | 2 | 0.0867 | 10.66 |
|  |  | 9-3 | 3 | 0.1044 | 8.84 |
|  | 97 | 10-1 | 1 | 0.0511 | 18.05 |
|  |  | 10-2 | 2 | 0.0489 | 18.89 |
|  |  | 10-3 | 3 | 0.0667 | 13.85 |
|  | 100 | 11-1 | 1 | 0.0578 | 15.96 |
|  |  | 11-2 | 2 | 0.0640 | 14.42 |
|  |  | 11-3 | 3 | 0.0708 | 13.04 |
|  | 102 | 12-1 | 1 | 0.0850 | 10.87 |

Examples 13 and 14

Figure 2:
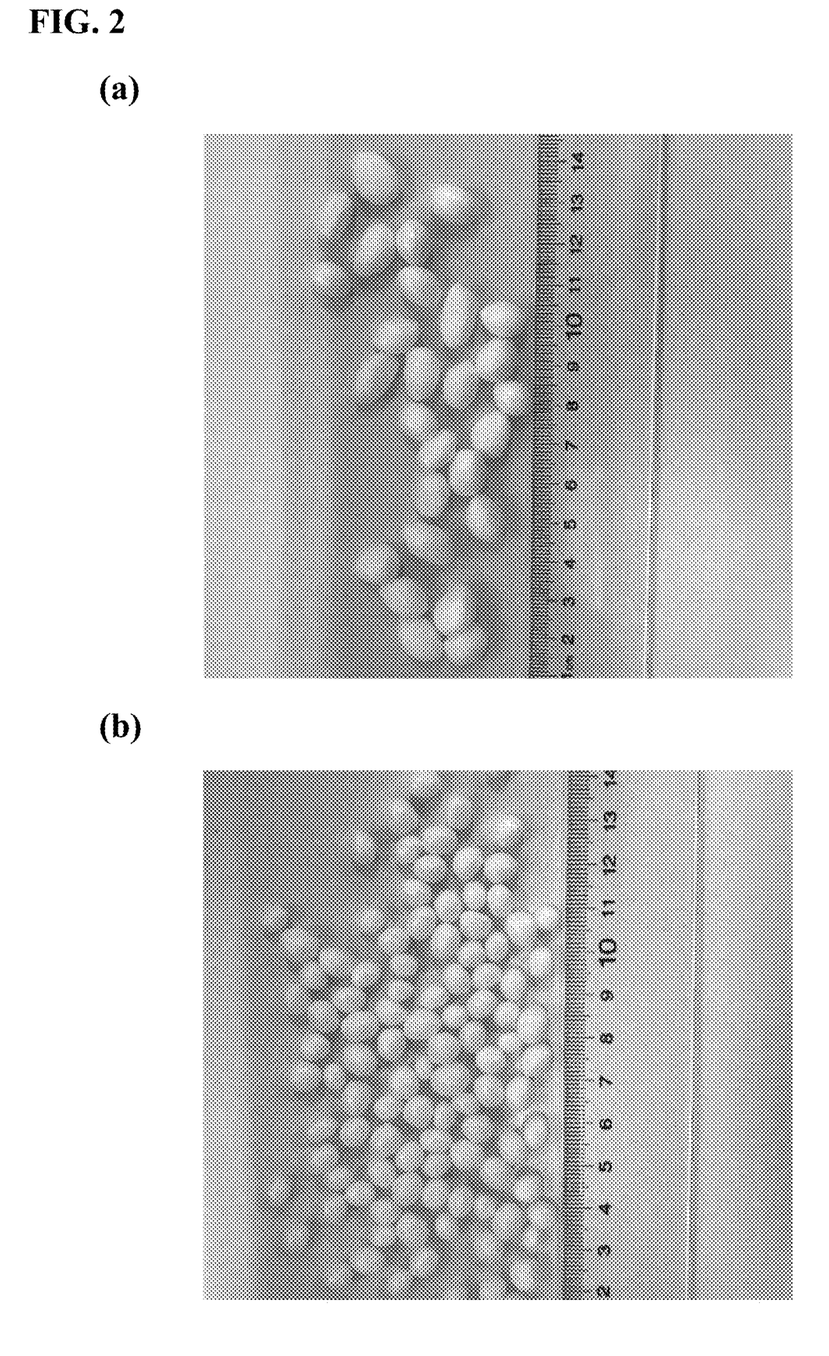
Figure 3:
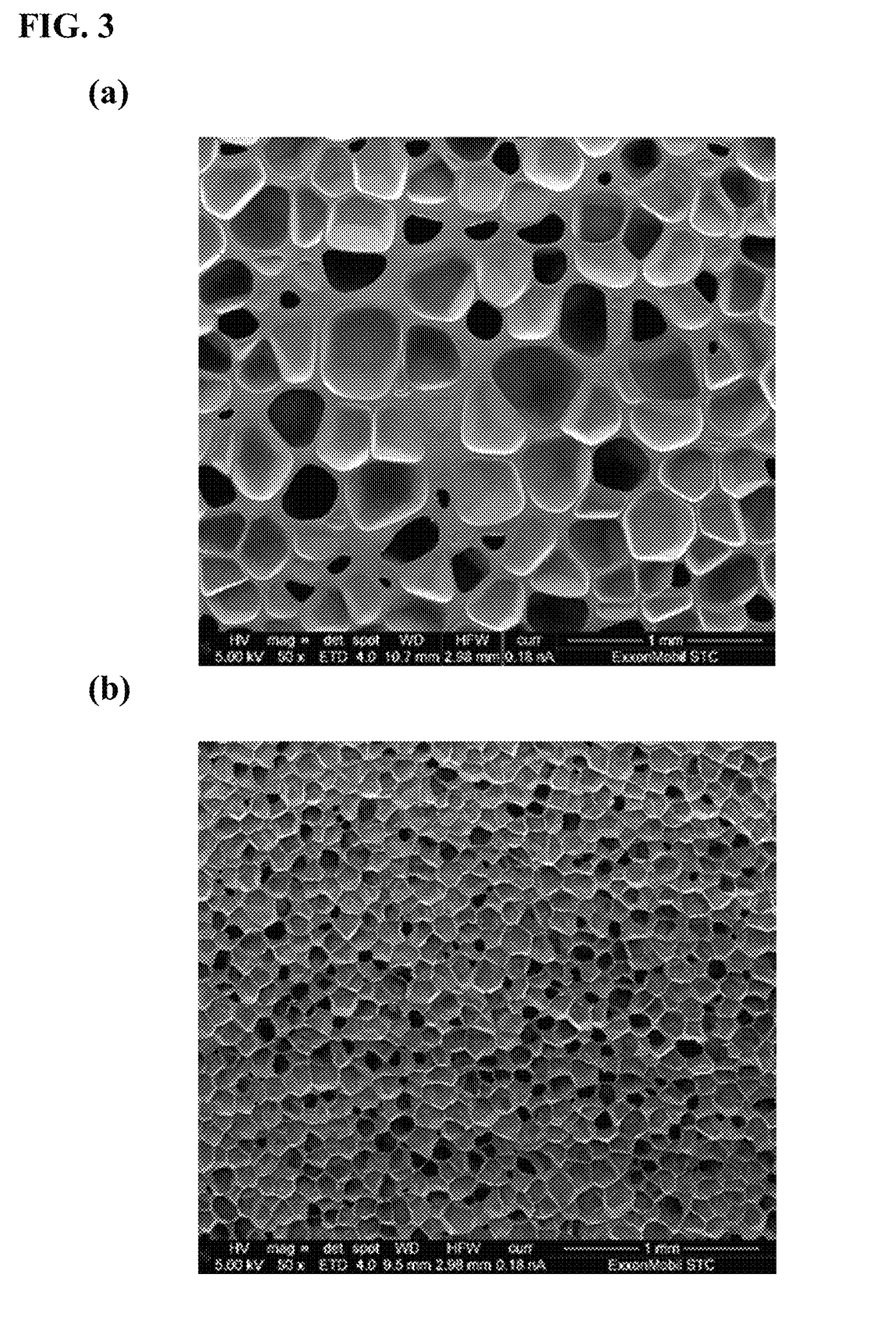

The following process was used to make the foam beads. As shown in FIG. 1, chamber 1 was preheated to the set temperature, such as room temperature, then extruded micro-pellets of PBE2 and PBE3, each having a diameter of less than 5 mm, were added into the chamber 1, which was then sealed. A vacuum pump 2 was opened to reduce the pressure in chamber 1. After the chamber 1 was vacuumed, $CO_2$ was pumped into the chamber 1 via a booster pump 4 from tank 3 until the chamber had a set pressure of about 20 MPa. Chamber 1 was then heated to a temperature around the melting temperature of PBE2 and PBE3 respectively via a temperature control unit 5, causing the pellets to be impregnated and expanded by $CO_2$ in the chamber for a period of about 10 to 30 minutes. After that, a valve connected with chamber 1 was quickly opened to release the pressure of chamber 1. The sample expanded with $CO_2$ was quickly removed from the chamber to measure its weight. The measured density of foam beads from PBE2 was 0.1246 g/cm$^3$, and the measured density of foam beads from PBE3 was 0.037 g/cm$^3$. The sizes and internal cell structures of obtained foam beads are shown in FIGS. 2 and 3. The cell structure was observed by scanning electron microscope (SEM).

All documents described herein are incorporated by reference herein. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A foam bead, consisting of:
   a propylene-based copolymer having at least about 75 wt. % units derived from propylene and about 3 wt % to about 25 wt. % of units derived from at least one of ethylene and/or $C_4$-$C_{20}$ alpha-olefins, based on the total weight of the propylene-based copolymer, and having a triad tacticity of three propylene units by $^{13}C$ NMR of at least 75%, and a heat of fusion of less than about 75 J/g, and a melting temperature (Tm) of less than about 110° C.;
   at least one physical blowing agent and
   less than 0.01 wt % of a chemical blowing agent, based on total weight of the physical and chemical blowing agents, and wherein
   the foam bead has a density of from about 0.01 g/cm$^3$ to about 0.5 g/cm$^3$ and a diameter of from about 0.1 to about 20 mm.

2. The foam bead of claim 1 having a density of from about 0.01 to about 0.30 g/cm$^3$.

3. The foam bead of claim 1 having a density of from about 0.03 to about 0.10 g/cm$^3$.

4. The foam bead of claim 1, wherein the foam bead has a diameter of from about 4 mm to about 20 mm.

5. The foam bead of claim 1, wherein the foam bead has diameter of from about 5 to about 15 mm.

6. The foam bead of claim 1, wherein the propylene-based copolymer has a density of greater than about 0.85 g/cm$^3$.

7. The foam bead of claim 1, wherein the propylene-based copolymer has about 3 to 20 wt. % of units derived from ethylene, based on the weight of the propylene-based copolymer, and has a melt flow rate (ASTM D-1238; 2.16 kg, 230° C.) of about 2 g/10 min to about 20 g/10 min.

8. The foam bead of claim 7, wherein the propylene-based copolymer has from about 83 wt. % to about 97 wt. % of propylene-derived units and from about 3 wt. % to about 17 wt. % of ethylene-derived units.

9. The foam bead of claim 7, wherein the propylene-based copolymer further has at least one of the following properties:
   (ii) a heat of fusion (Hf) of less than about 50 J/g;
   (iii) a melt flow rate (ASTM D-1238; 2.16 kg, 230° C.) of less than about 50 g/10 min;
   (iv) a weight average molecular weight (Mw) of from about 100,000 to about 500,000 g/mol;
   (v) a number average molecular weight (Mn) of from about 50,000 to about 500,000 g/mol;
   (vi) a molecular weight distribution (Mw/Mn) of less than about 4; and
   (vii) a Shore D hardness of less than about 55.

10. The foam bead of claim 1, wherein the foam bead has two or more cells.

11. The foam bead of claim 10, wherein the cells have an average cell diameter from about 1 to about 300 microns.

12. The foam bead of claim 10, wherein the foam bead has a closed cell ratio of at least 30%.

13. The foam bead of claim 1, wherein the propylene-based copolymer further has:
   a melt flow rate (ASTM D-1238; 2.16 kg, 230° C.) of less than about 50 g/10 min;
   a weight average molecular weight (Mw) of from about 100,000 to about 500,000 g/mol;
   a number average molecular weight (Mn) of from about 50,000 to about 500,000 g/mol;
   a molecular weight distribution (Mw/Mn) of less than about 4; and
   a Shore D hardness of less than about 55.

14. The foam bead of claim 13, wherein the density of the foam bead is about 0.01 to about 0.3 g/cm$^3$.

15. The foam bead of claim 1, wherein the at least one physical blowing agent is carbon dioxide, nitrogen, or hydrocarbons having 1 to 5 carbon atoms.

16. The foam bead of claim 1, wherein the at least one physical blowing agent is carbon dioxide.

17. An article made from the foam bead of claim 1.

18. The foam bead of claim 1, wherein the propylene-based copolymer is a reactor blended polymer of a first polymer component and a second polymer component, wherein the first polymer component has an alpha-olefins content (R1) and the second polymer component has an alpha-olefins content (R2).

19. The foam bead of claim 18, wherein R1 is 5 wt % to 30 wt % and R2 is 1 wt % to 10 wt %.

20. A foam bead, consisting of:
   a propylene-based copolymer having at least about 75 wt. % units derived from propylene and about 3 wt % to about 25 wt. % of units derived from at least one of ethylene and/or C4-C20 alpha-olefins, based on the total weight of the propylene-based elastomer, and having a triad tacticity of three propylene units by $^{13}$C NMR of at least 75%, and a heat of fusion of less than about 75 J/g, and a melting temperature (Tm) of less than about 110° C.;
   at least one physical blowing agent and less than 0.01 wt % of a chemical blowing agent, based on total weight of the blowing agent, wherein the at least one physical blowing agent is carbon dioxide, nitrogen, or one or more hydrocarbons having 1 to 5 carbon atoms,
   wherein the foam bead has a density of from about 0.01 g/cm$^3$ to about 0.2 g/cm$^3$ and a diameter of from about 0.1 to about 20 mm.

* * * * *